July 27, 1943.  W. R. TUCKER  2,325,348
TURRET CONTROL
Original Filed April 22, 1940  4 Sheets-Sheet 1

INVENTOR
WARREN R. TUCKER
BY Toulmin & Toulmin
ATTORNEYS

July 27, 1943.  W. R. TUCKER  2,325,348
TURRET CONTROL
Original Filed April 22, 1940  4 Sheets-Sheet 2

INVENTOR
WARREN R. TUCKER
BY Toulmin & Toulmin
ATTORNEYS

July 27, 1943.    W. R. TUCKER    2,325,348
TURRET CONTROL
Original Filed April 22, 1940    4 Sheets-Sheet 4

INVENTOR
WARREN R. TUCKER
By Toulmin & Toulmin
ATTORNEYS

Patented July 27, 1943

2,325,348

UNITED STATES PATENT OFFICE 2,325,348

TURRET CONTROL

Warren R. Tucker, Dayton, Ohio, assignor to The Hydraulic Development Corporation, Inc., Wilmington, Del., a corporation of Delaware Original application April 22, 1940, Serial No. 330,870. Divided and this application April 18, 1941, Serial No. 389,229

6 Claims. (Cl. 18—20)

This invention relates to presses and press control systems, and in particular to turret presses having rotary turrets for feeding the workpieces to the press.

One object of this invention is to provide a turret press in which the shifting movement of the turret from one position to another position is hydraulically and gradually slowed down when the turret approaches its new position, so as to avoid any jar or shock.

Another object of the invention consists in providing a turret press in which the turret is shifted from one working position to another working position by mere hydraulic means.

Another object is to provide a turret press in which the turret may be hydraulically lifted off its working position, thereafter hydraulically rotated by a predetermined angle and then hydraulically lowered into another working position.

Another object is to provide a press of the above character in which the shifting movement of the turret is controlled by a hydraulic motor.

A still further object of the invention is to provide a turret press in which the shifting movement of the turret from one working position to another working position is controlled by a hydraulic motor, which once started on its cycle controls valve means for determining the proper sequence of the movements of the turret during a shifting movement from one working position to another working position.

It is a still further object of the invention to provide a turret press in which the shifting movement of the turret from one working position to another working position is effected by a hydraulic motor, the cycle of which is initiated by closing an electric circuit and in which the said hydraulic motor, during its cycle, controls said electric circuit for determining the sequence of the motor movements.

A still further object of the invention is to provide a turret press in which the shifting movement of the turret from one working position to another working position is controlled by a hydraulic motor which may be micromatically adjusted for the exactly desired shifting movement of the turret.

Another object of the invention is to provide a turret press in which the various movements of the turret are timed automatically in a predetermined sequence without the necessity for attention thereto by the operator, or the dependence upon his judgment, such movements including lifting of the turret off the press bed, its rotation, its lowering upon the press bed and the locking of the turret.

These and other objects and advantages of the invention will appear more clearly from the following specification in connection with the accompanying drawings.

This application is a division of my copending application, Serial No. 330,870, filed April 22, 1940.

In the drawings:

Figure 2 is a view partly in section of the press of Figure 1 on a somewhat larger scale.

General arrangement

In general, the turret press of the present invention consists of a press frame having a bed and a head interconnected by strain rods. The turret is normally supported upon the bed of the press during the pressing operation, but is raised from the press bed during its rotating or indexing operation. After the indexing operation is completed, the turret is brought to rest again upon the press bed. The lifting and indexing operation of the turret is effected by means of a hydraulic motor which comprises a plurality of cylinder piston assemblies, one of which effects the lifting and lowering movement of the turret, whereas another cylinder piston assembly causes the rotating movement of the turret.

According to the present invention, the lifting cylinder piston assembly first spaces the turret from the press bed, then is rotated together with the turret by another cylinder piston assembly, whereafter it is lowered to seat the turret again on the press bed, and finally is rotated by means of the other piston cylinder assembly to its initial position so as to be ready for a new cycle.

The movements and sequence of movements of the hydraulic motor for carrying out the indexing movement of the turret, is controlled by valve means which may be arranged in an electric circuit controlled, in its turn, by movements of the hydraulic motor.

Mechanical construction

Figure 1:
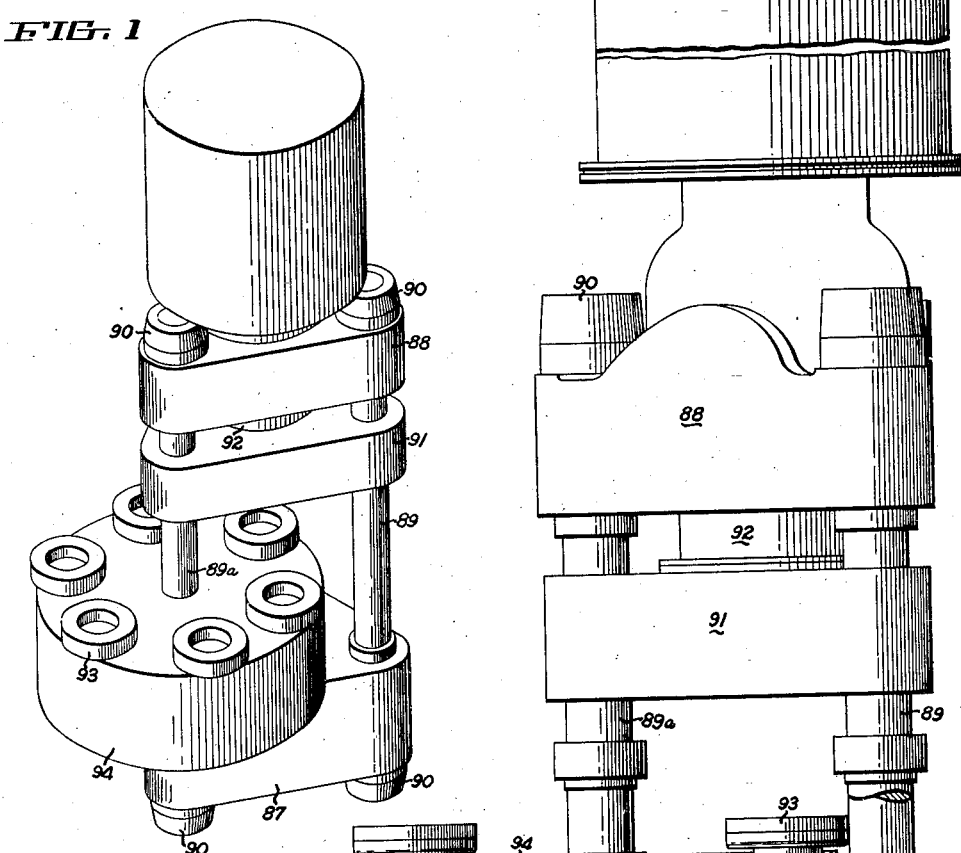
Figure 1 is a perspective view of a turret press in which the turret is rotatable about one of the strain rods.
Figure 8:
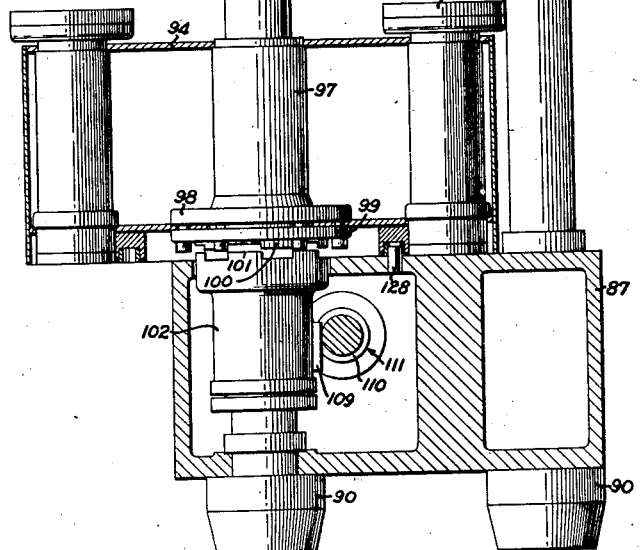

Referring to the drawings in detail, the press disclosed therein comprises a press bed 87 and a press head 88 interconnected by three strain rods 89 and 89a with nuts 90 threaded upon the ends thereof. Slidably mounted on the strain rods 89 and 89a is a press platen 91 connected with the pressing plunger 92 and being adapted to carry an upper die cooperating selectively with one of a plurality of dies to be mounted in the die receiving members 93 arranged along a circle on the turret 94. The turret 94 of Figure 1 is rotatable about one of the strain rods, namely, the strain rod 89a.

Figure 3:
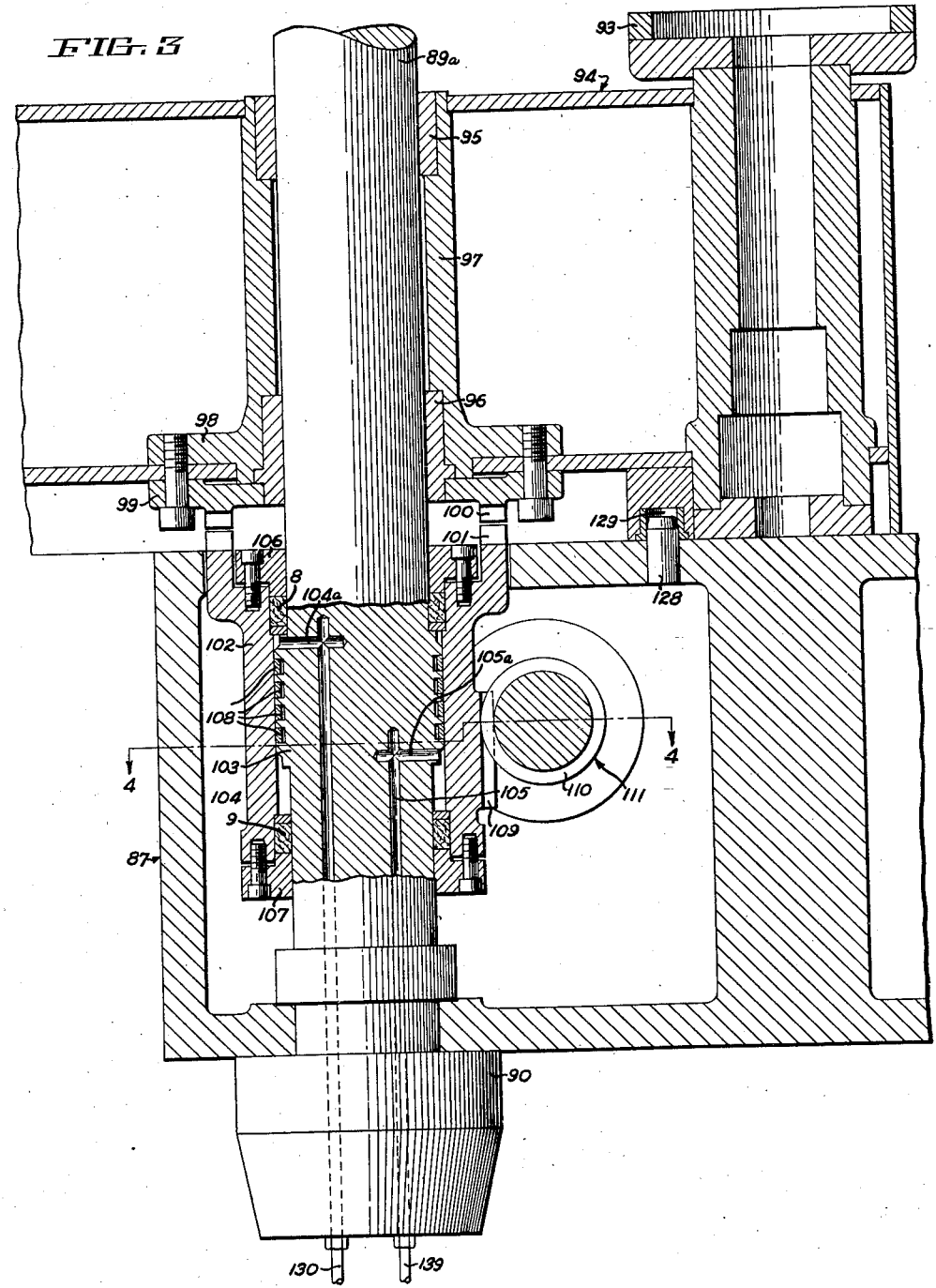
Figure 3 is a section through the lower portion of Figure 2, including the press bed and the hydraulic motor for operating the turret.

As will be seen from Figure 3, the strain rod 89a guides by means of bushings 95 and 96, a sleeve 97 having its flange 98 threaded to, or otherwise connected with the turret 94. Also connected by screws, or other convenient means, with the turret 94 is a clutch member 99 having jaws 100 adapted to engage corresponding recesses 101 of a sleeve 102. The sleeve 102 slidably surrounds a portion 103 of the strain rod 89a and is adapted to be reciprocated relative thereto, by means of fluid introduced through passageways 104, 104a and 105, 105a respectively. In order to prevent leakage at the ends of the sleeve 102, packing material 8 and 9 is provided and respectively compressed by glands 106 and 107. Furthermore, to establish a close fit of the strain rod portion 103 in the sleeve 102, piston rings 108 are provided at the periphery of the strain rod portion 103.

The sleeve 102 is provided at its outside with a gear segment 109 meshing with a circular rack 110 provided on a ram, generally designated 111. The teeth on the segment 109 and on the rack 110 are so elongated as to remain enmeshed even when the lifting sleeve 102 is in its lowermost position. The ram 111 is provided with two piston heads 112 and 113 reciprocably mounted in cylinders 114 and 115 respectively. The cylinders 114 and 115 are mounted in the casing 116, forming a part of the bed 87, and simultaneously act as glands compressing the packing material 117 and 118 respectively mounted between the lower portion of the cylinders 114 and 115 and cylindrical portions 119 and 120 respectively of the casing 116.

The ram 111 comprises an axial bore traversed by a valve rod 121 having slots 122 and 123 at its ends fitting closely into bores 124 and 125 of the cylinder head portions 126 and 127 respectively. The ends of the valve rod 121 extend into the cavities 55a and 56a formed in the cylinder head portions 126 and 127 respectively.

Fixedly carried on the outer ends of the piston heads 112 and 113 are plates 57a and 58a respectively surrounding the valve rod 121 with constant clearance, which clearance is comparable to the clearance existing between the ram 111 and the valve rod 121. The plates 57a and 58a are each formed with a radially extending groove 59a and 60a respectively, which serves to admit the pressure fluid into the pressure cavities 61a and 62a formed in the cylinder head portions 126 and 127 respectively in a manner which will presently appear. The plates 57a and 58a are formed with an annular abutting portion 63a and 64a respectively, which is adapted to abut the inner faces 65a and 66a of the ends of the cylinder head portions 126 and 127.

The plates 57a and 58a are each further provided with an annular recess within which is received the floating rings 67a and 68a respectively. The floating rings 67a and 68a are held in place by the plates 57a and 58a and allowed to move radially to prevent binding of the valve rod 121 due to any misalignment thereof with the rings 67a and 68a and with guides 53a and 54a. The floating rings 67a and 68a slidably engage the surface of the valve rod 121 with an extremely close clearance, whereby the escape of pressure fluid along the rings toward the middle of the valve rod 121 is prevented. This construction is exceedingly reliable and compact, and allows the valve rod 121 to shift readily without having the seal destroyed. It will be understood that the rings 67a and 68a likewise engage the surface of the plates 57a and 58a and of the cylinder head portions 126 and 127 slidably, but with extremely close clearance.

Figure 4:
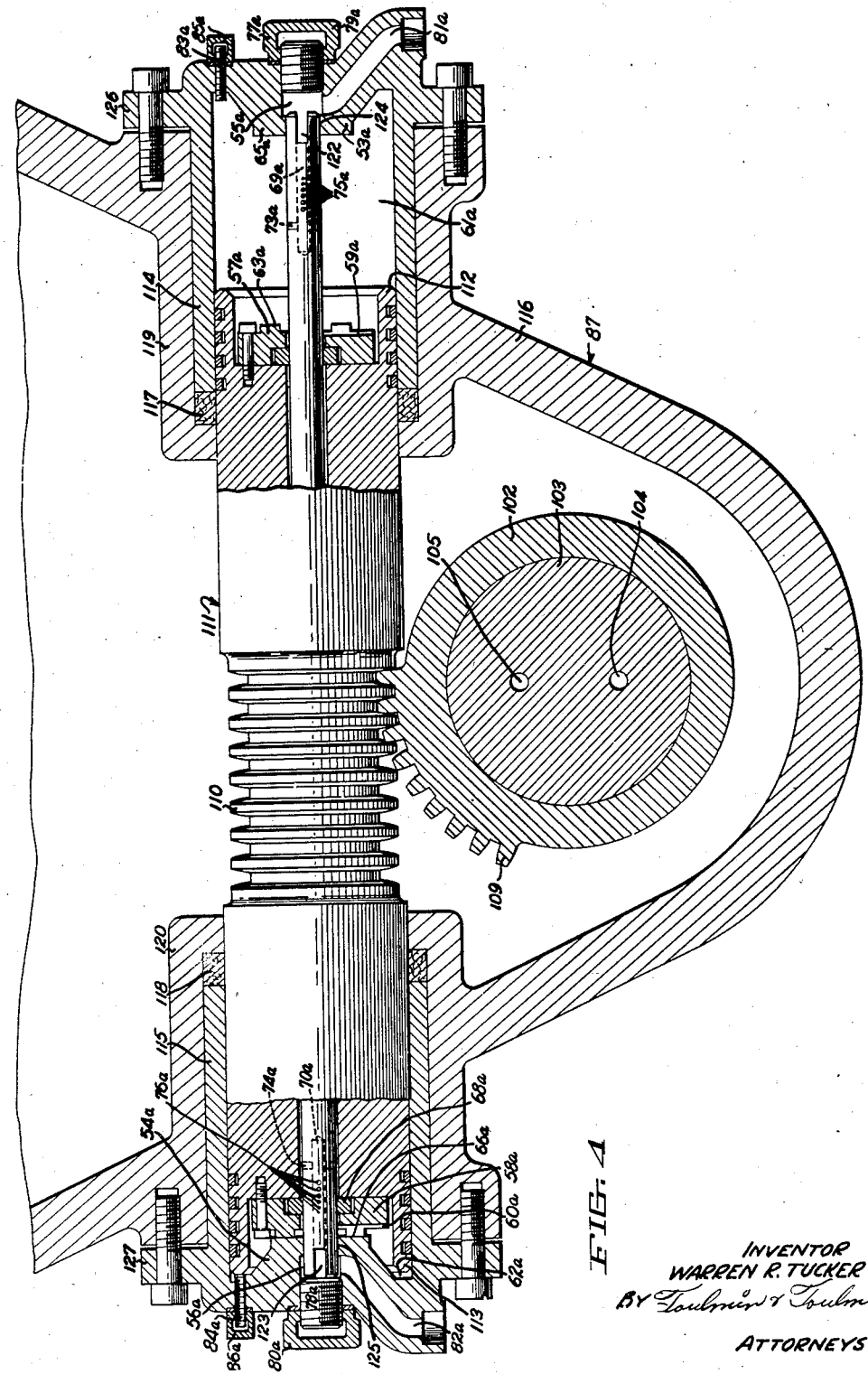
Figure 4 is a section along the line 4—4 of Figure 3.

The valve rod 121 has axial holes 69a and 70a drilled from both ends of the valve rod 121, as viewed in Figure 4, and communicating with the slots 122 and 123 at the ends of the valve rod 121. On the right-hand end of the valve rod 121 (with respect to Figure 4) toward the inward end of the hole 69a are four radial connecting bores 73a which are relatively large in diameter and adapted freely to connect the bore 69a with the chamber 61a in the cylinder head portion 126. The other end of the valve rod 121 is similarly provided with identical holes 74a. Located outwardly of these holes 73a and 74a are a series of longitudinal spaced connecting holes 75a and 76a respectively; these holes 75a and 76a are progressively more closely spaced and of progressively smaller diameter as one proceeds outwardly from the holes 73a and 74a. The holes 75a and 76a are disposed in a single row on only one side of the valve rod 121 instead of extending in four directions as do the holes 73a and 74a, and these holes 75a and 76a likewise communicate with the bores 69a and 70a.

The ends of the valve rod 121 are adapted to abut against threaded plugs 77a and 78a, which are threadedly mounted in the ends of the cylinder head portions 126 and 127 respectively. These plugs 77a and 78a are covered by removable end caps 79a and 80a respectively, which serve to prevent unauthorized changes in the positions of the plugs, and also serve to prevent leakage around the plugs.

Communicating with the cavities or chambers 55a and 56a are conduits 81a and 82a respectively, which are adapted to act either as inlet or discharge conduits, depending on the direction in which the ram 111 is being moved. The plugs 77a and 78a are so adjusted that when the valve rod 121 abuts against one of them, the slot 122 or 123 in the other end of the valve rod 121 is adapted to freely interconnect the conduit 81a or 82a and the chamber 55a or 56a with the pressure cavity 61a or 62a, this being accomplished by having the slots 122 and 123 made of such a length that the slots extend into the interior of the chamber 61a or 62a. This is indicated at the right-hand end portion of Figure 4, in which the slot 122 has a considerable portion disposed within the chamber 61a and, hence, is adapted to allow free entry of the pressure fluid from the conduit 81a into the chamber 61a where it may act upon the piston head 112 of the ram 111 to move the same away from the fluid inlet.

When the valve rod 121 abuts one of the plugs 77a or 78a, its slot 122 or 123 is in non-relationship with the pressure cavity 61a or 62a as is indicated in the left-hand end portion of Figure 4, whereby when the pressure fluid is first admitted, its first action is to move the valve rod 121 axially into engagement with the other plug 77a or 78a. This action also serves to bring the slot 122 or 123 in communication with the chamber 61a or 62a, thereby allowing the pressure fluid to act upon the piston head 112 or 113.

The device shown in Figure 4 is furthermore provided with micromatic screws 83a and 84a respectively mounted at each end of the cylinder head portions 126 and 127 and adapted, if desired, to engage the adjacent piston heads 112 and 113 so as to stop the same. These micromatic screws 83a and 84a allow a micromatic adjustment of the stroke of the ram 111. In order to prevent undue operation of the micromatic screws 83a and 84a from the outside of the device, protecting caps 85a and 86a, similar to the caps 79a and 80a, cover the outer portion of the micromatic screws 83a and 84a, while simultaneously acting as locking nuts.

The stroke of the ram 111 is sufficient to produce the desired rotation of the vertical lifting cylinder 102 (Figure 3). After this desired rotation has been accomplished, the finished surface of the annular abutting portion 63a or 64a of the plate 57a and 58a or ram 111 will be in connection with the finished surface 65a or 66a respectively on the inward surface of the cylinder head portions 126 or 127.

The reverse rotation to the same extent of the lifting cylinder 102 will bring the corresponding surfaces 63a or 64a into connection with the surfaces 65a or 66a. Thus Figure 4 corresponds to a position in which the ram 111 is in one of its end positions and ready for a stroke to bring about a rotation of the lifting cylinder 102. Upon completion of the rotation of the lifting cylinder 102 by movement of the ram 111 toward the conduit 81a, the surface 63a of the plate 57a will be in corresponding contact with the surface 65a of the cylinder head portion 126.

Likewise, in Figure 4 the admission of pressure fluid through the conduit 82a will cause the valve rod 121 to move toward the plug 77a and eventually to abut the same, whereupon pressure fluid will freely flow through slot 123 into the chamber 62a where it acts upon the piston head 113 to move the ram 111 toward the surface 65a of the cylinder head portion 126. As the ram 111 approaches the limit of its travel toward the surface 65a, the cushioning action will take place, this cushioning action being more fully described below in connection with the operation of the device. Similar operation will take place when the ram 111 moves in the reverse direction.

Referring again to Figure 3, the turret 94 rests upon the press bed 87 and is held in its respective position by one or more holding pins 128 engaging a corresponding lined recess 129 in the turret 94.

As will be clear from the above, the sleeve 102 may be lifted so as to have its jaws 101 engage the corresponding recesses 100 of the turret 94, and to lift the turret 94 for disengaging the same from the holding pin or pins 128. By operation of the rack 110, the sleeve 102 and, thereby, also the turret 94 may then be rotated in accordance with the length of the stroke of the piston heads 112 and 113.

The detailed rotating and indexing operation will be more fully described below.

*Hydraulic and electric control circuit*

Figure 5:
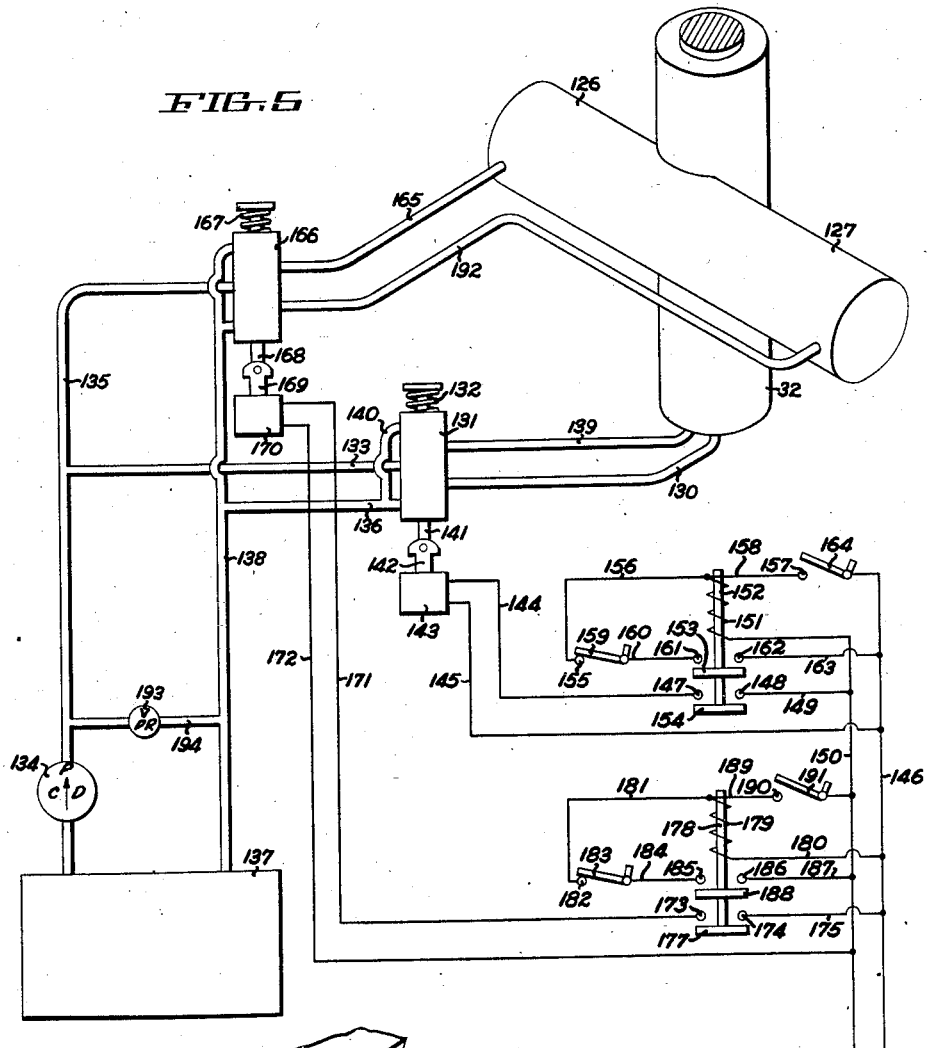
Figure 5 shows a hydraulic and electric control circuit for the turret press according to the present invention.

Referring now to Figure 5 diagrammatically illustrating the hydraulic and electric control circuit, the bore 104 (Figure 3) is connected with a conduit 130 leading to a four-way valve 131 comprising a valve member (not shown) which is urged into its upper position by means of a spring 132 and is adapted selectively to establish communication of the conduit 130 with a conduit 133 leading to the pressure side of a pump 134 by means of a conduit 135, or to establish communication between the conduit 130 and the conduit 136 leading to a fluid tank 137 by means of a conduit 138. The bore 105 (Figure 3) in the strain rod portion 103 communicates with a conduit 139, likewise leading to the four-way valve 131 and adapted selectively to be connected with a conduit 140 branching off from the conduit 136, or to be connected with the conduit 133.

The shaft 141 of the valve member of the four-way valve 131 is operatively connected with the armature 142 of an electric relay 143, the terminals of which are connected with the lines 144 and 145, the latter leading to the main supply line 146. The line 144 leads to a contact 147 spaced from a contact 148 connected by line 149 with the main supply line 150. The main supply line 150 is connected with a relay coil 151 associated with the armature 152 carrying the switch blades 153 and 154, the latter of which is adapted to bridge the contacts 147 and 148.

The relay coil 151 is connected on one end with a contact 155 by means of the line 156, and on the other end with a contact 157 by means of the line 158. The contact 155 cooperates with the normally closed switch 159 connected by the line 160 with a contact 161 adapted to be connected with a contact 162 by means of the armature blade 153. The contact 162 is connected by the line 163 with the main supply line 146, which latter is connected with a normally open limit switch 164.

Depending on whether the contacts 161 and 162 and the contacts 147 and 148 are bridged by the blades 153 and 154 respectively, and whether the switch 159 is closed or not, relay 143 will either be energized or deenergized so that pressure fluid enters the hollow arm 32 either through conduit 130 or conduit 139 so that the lifting plunger 25 will perform either an upward stroke or a downward stroke.

A control circuit similar to that just described in connection with the strain rod portion 103 is provided for the ram 111 in connection with the cylinder head portions 126 and 127. To this end the conduit 81a (Figure 4) is connected by means of a conduit 165 with a four-way valve 166 similar to the four-way valve 131 just described. Also in this valve 166, the valve member (not shown) is continuously urged into its upward position by means of a spring 167 and has its shaft 168 operatively connected with an armature 169 of an electric relay 170.

The terminals of the relay 170 are connected by means of the lines 171 and 172 with a contact 173 and main supply line 150 respectively. Associated with the contact 173 is a second contact 174 connected by line 175 with the other main supply line 146. Similar to the control circuit described in connection with the hollow arm 32, the contacts 173 and 174 may be bridged by an armature blade 177 of the armature 178, the relay coil 179 of which is connected by means of line 180 with the main supply line 146, and by means of the line 181 with the contact 182 of a normally closed switch 183 having its other contact connected by line 184 with a contact 185. Associated with the contact 185 is a contact 186 connected through line 187 with a main supply line 150 and adapted to be connected with the contact 185 by the plate 188 likewise carried by the armature 178.

The relay coil 179 is furthermore connected by line 189 with the contact 190 cooperating with a normally open switch 191, the other contact being connected with the main supply line 150.

As will be clear from the above, the energization and deenergization of the relay 170 will cause the pressure fluid from the pump 134 to pass through the conduit 192 connected with the conduit 82a, thereby moving the piston head 112 away from the conduit 82a, or will direct the pressure fluid passing through conduit 165 into the conduit 82a, thereby moving the piston head 113 toward the conduit 82a.

The hydraulic circuit shown in Figure 5 furthermore comprises a pressure relief valve 193 mounted in a conduit 194 connecting the conduits 138 and 135.

Figure 6:
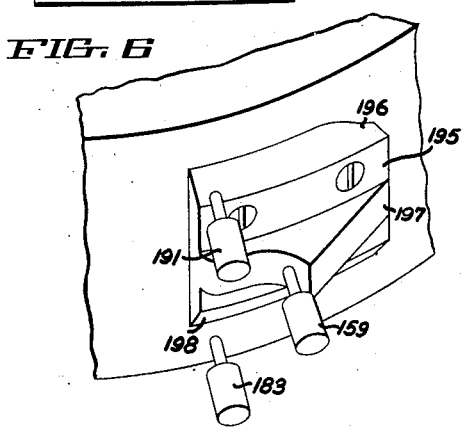
Figure 6 illustrates a detail of the controlling mechanism cooperating with the control circuit shown in Figure 5.

Figure 6 shows a portion of the turret having arranged on its periphery a plurality of cam blocks, generally designated 195, and comprising three cams 196, 197 and 198. The number of the cam blocks corresponds to the number of turret stations or die receiving members 93. The cams 196, 197 and 198 are so arranged that the cam 196 cooperates with the switch 191, while the cams 197 and 198 cooperate with the switches 159 and 183 respectively.

*Operation*

When the pressing plunger approaches the end of its retraction stroke, the limit switch 164 is momentarily closed either manually or automatically, for instance, by means of the pressing platen, so that the circuit through the relay coil 151 is closed. Current then flows from the main supply line 146 through switch 164, line 158, relay coil 151, to the main supply line 150. The energization of the relay coil 151 causes attraction of the armature 152 so that the blade 153 of armature 152 bridges the contacts 161 and 162, while the armature blade 154 bridges the contacts 147 and 148. Since the switch 159 is normally closed, the release of the limit switch 164 will not cause deenergization of the relay coil 151, since the attraction of the armature blade 153 closes the holding circuit for the relay coil 151, which holding circuit comprises the main supply line 146, the line 163, contact 162, blade 153, contact 161, line 160, switch 159, contact 155, line 156, relay coil 151 and main supply line 150. The attraction of the armature blade 154 closes the energizing circuit for the relay 143, said circuit comprising the main supply line 146, line 145, relay 143, line 144, contact 147, blade 154, line 149 and main supply line 150.

The energization of the relay 143 causes a downward movement of the armature 142 against the thrust of the spring 132, thereby also moving downwardly the shaft 141 pertaining to the valve member of the four-way valve 131. Downward movement of the valve member pertaining to the four-way valve 131 establishes communication between the conduit 130 and the conduit 133 connected with the pressure side of the pump 134 by means of the conduit 135, while the conduit 139 then communicates with the conduit 140 connected with the fluid tank 137 by conduits 136 and 138. Consequently, pressure fluid from the pump 134 passes through the conduit 130 and enters the bore 104 in the strain rod portion 103, thereby lifting the lifting cylinder 102, which first causes engagement of the recesses or clutch elements 101 with the jaws or clutch elements 100 connected to the turret 94, and thereafter lifts the turret 94 to such an extent that it disengages the holding pin 128. During this lifting movement of the lifting cylinder 102, the fluid expelled from the cylinder 102 passes through the bores 105a and 105, the conduit 139, four-way valve 131, conduits 140 and 138 to the tank 137.

As soon as the turret 94 has been lifted so as to disengage the holding pin 128, the cam 196 of the cam block 195 causes the switch 191 to engage the contact 190, thereby closing an electric circuit comprising the main supply line 146, line 180, relay coil 179, line 189, contact 190, switch 191 and the main supply line 150. The closure of this circuit causes energization of the relay coil 179 so that the blades 188 and 177 respectively bridge the contacts 185 and 186 and the contacts 173 and 174. The bridging of the contacts 185 and 186 establishes a holding circut for the relay coil 179 through the main supply line 146, line 180, relay coil 179, line 181, contact 182, the normally closed switch 183, line 184, contact 185, blade 188, contact 186, line 187 and the main supply line 150. The bridging of the contacts 173, 174, through the blade 177, closes a circuit comprising the main supply line 146, line 175, contact 174, blade 177, contact 173, line 171, relay 170, line 172 and main supply line 150. The closure of this circuit energizes the relay 170 so that its armature 169, together with the shaft 168 of the valve member pertaining to the four-way valve 166, is moved downwardly against the thrust of the spring 167. This downward movement of the four-way valve 166 establishes communication between the conduit 165 connected with the conduit 81a of the cylinder head portion 126 (Figure 4), and the conduit 138 leading to the tank 137. The downward movement of the valve member pertaining to the valve 166 also establishes communication between the conduit 192 leading to the conduit 82a of the cylinder head portion 127 and the conduit 135 leading to the pressure side of the pump 134.

Pressure fluid from the pump 134 now flows through the conduit 192 and enters the passageway 82a of the cylinder 115 (Figure 4). Pressure fluid then passes from the passageway 82a into the slot 123 and moves the valve rod 121 toward the plug 77a until it abuts the latter. When this movement of the valve rod 121 is completed, the slot 123 of the valve rod 121 will have passed through the close fitting guide bore 125 so that fluid, under pressure, can pass from the passageway 82a through the slot 123 into the chamber 62a in the cylinder 115, thus applying pressure upon the piston head 113.

The ram 111 will now move toward the passageway 81a displacing pressure fluid from the chamber 61a through the holes 73a, 75a and thence out through the passageway 81a, the conduit 165, four-way valve 166 and the conduit 138 into the fluid tank 137, thereby reducing reduction in the discharge area and a throttling of the oil discharged from the chamber 61a. As the ram 111 approaches the end of its stroke toward the passageway 81a, the ring 67a covers sequentially the holes 75a, thereby gradually still further reducing the discharge area and still further exerting a throttling effect of the discharge of the fluid, so that the said movement of the ram 111 gradually slows down until it is stopped by engagement of the abutting surface 63a of the cylinder head portions 126.

The movement of the ram 111, as just described, causes the rack 110, meshing with the gear segment 109, to rotate the sleeve 102 by a predetermined distance corresponding with the distance between two indexing positions, the end of this rotating movement corresponding to the new indexing position. When this position is reached, cam 197 of the next cam block 195 engages the switch 159, thereby breaking the holding circuit for the relay 151 and, consequently, deenergizing the relay 143 so that the valve member of the four-way valve 131 is shifted into its upper position by the spring 132. Therefore, fluid pressure from the pump 134 now passes through the conduits 135, 133, the four-way valve 131 and the conduit 139 into the bore 105. From here the pressure fluid flows through the bore 105a, the annular space between the strain rod portion 103, the packing material and the sleeve 102, thereby causing a downward movement of the sleeve 102.

When the jaws 101 of the sleeve 102 have disengaged the clutch member 99, in which position the turret 94 is seated upon the bed 87 and locked by the holding pin 126, the cam 198 opens the switch 183, thereby breaking the holding circuit for the relay 179 and deenergizing the relay 179. Consequently, the valve member of the four-way valve 166 is shifted to its upper position by the spring 167 and pressure fluid from the pump 134 now passes through the conduit 165 into the passageway 81a, from where it enters the slot 122 of the valve rod 121 and moves the valve rod 121 toward the plug 70a until it abuts the latter. Fluid then acts upon the piston head 112 so as to move the ram 111 toward the passageway 82a while slowing down this movement when the ram 111 approaches the end of this stroke. During this movement fluid expelled by the piston head 113 passes through the conduit 82a, the conduit 192, the four-way valve 166 and the conduits 199, 138, into the fluid tank 137. The last mentioned stroke of the ram 111 returns the sleeve 102 to its previous angular position, so that the device is ready for another indexing movement.

Although in the above operation of the embodiments shown in the drawings, the indexing movement is described as being started at the end of the retraction stroke of the press ram, it is of course, understood that the indexing movement of the turret may be started at any other point of the retraction stroke of the press ram, if so desired. Also, the press ram may start its working stroke after the indexing movement has been completed and the indexing mechanism returned to its initial position, or before the indexing movement has been fully completed.

Summary of operation

The operation of the device according to the present invention may be summarized as follows:

When the indexing operation of the turret is to be effected, pressure fluid is to be introduced into the cylinder-piston-assembly 102, 103 (Figure 3), so as to lift the turret 94 by means of the piston 102. The lifting movement of the turret causes the cam 196 on the turret to close the switch 191 (Figure 5), thereby supplying fluid from the pump 134 to the bore 82a (Figure 4) and causing the ram 111 to perform one stroke.

This movement of the ram is transferred by the rack 110 and the gear segment meshing therewith to the piston 102 so as to rotate the same together with the turret connected therewith by means of the clutch members 101, 100. In this way the turret is rotated by a predetermined angle, depending on the length of the stroke of the ram 111. This rotative movement is slowed down at the end thereof by the gradual closing of the bores 73a and 75a. At the end of this rotating movement of the turret, the switch 159 is opened so that the supply of pressure fluid to the piston 102 is reversed, resulting in a lowering of said piston, and declutching of said piston from the turret, thereby re-seating the turret on the press bed. In this position the turret opens, by means of the cam 198, the switch 183 causing a reverse movement of the ram 111, which results in a reverse rotation of the piston 102, thereby returning the said piston to its initial position.

It will be understood that I desire to comprehend within my invention such modifications as come within the scope of the claims and the invention.

Having thus fully described my invention, what I claim as new and desire to secure by Letters Patent is:

1. In a press, a press head, a press bed, a plurality of substantially vertical strain rods spacing and connecting said press bed and said press head, a vertically reciprocable turret rotatable about one of said strain rods, a double-acting stationary piston forming a part of said last mentioned strain rod and cooperating with a cylinder slidable in longitudinal direction on said stationary piston and being rotatable about the latter, means connected to said cylinder for selectively engaging and is engaging said turret, and a reciprocable fluid operable member in constant driving connection with said cylinder for rotating the same.

2. In a press, a press head, a press bed, a plurality of strain rods spacing and connecting said press bed and said press head, a support adapted to receive a plurality of dies and being rotatable about one of said strain rods, hydraulically operable means for selectively lifting said rotatable support off or re-seating the same on said press bed, a hydraulic motor for rotating said support by a predetermined angle when performing one cycle, and means associated with said hydraulically operable means and responsive to a predetermined movement thereof for causing driving connection between said support and said hydraulic motor, said motor comprising hydraulic means for slowing down the angular movement of said turret at the end of said angular movement.

3. In a press, a press head, a press bed, a plurality of substantially vertical strain rods spacing and connecting said press bed and said press head, a vertically reciprocable turret rotatable about one of said strain rods, fluid operable means associated with said turret for vertically reciprocating the same, hydraulic motor means in constant driving engagement with said fluid operable means for rotating said fluid operable means, and means associated with said fluid operable means and operable to connect the latter to said turret for rotation of said turret with said fluid operable means.

4. In a press, a press head, a press bed, a plurality of substantially vertical strain rods spacing and connecting said press bed and said press head, a turret reciprocable on and rotatable about one of said strain rods, fluid operable means associated with said turret for vertically reciprocating the same, means operable in response to a predetermined movement of said fluid operable means to connect said fluid operable means to said turret for rotation of said turret with said fluid operable means, hydraulic motor means in constant driving engagement with said fluid operable means for rotating the latter, and electric means responsive to the reciprocating movement in vertical direction of said turret for controlling the direction of operation of said hydraulic motor means.

5. In a press, a press head, a press bed, a plurality of strain rods spacing and interconnecting said press bed and said press head, a support for a plurality of dies rotatable about one of said strain rods, said one strain rod forming a stationary piston, a cylinder surrounding said piston and adapted to cooperate therewith so as to reciprocate on said piston for selectively lifting said support off or re-seating said support on said bed, means operable to rotate said cylinder by a predetermined angle, means operable to connect said cylinder and said support for rotation of said support with said cylinder, and hydraulic means, associated with the means operable to rotate said cylinder, for automatically slowing down said support at the end of its angular movement.

6. In a press, a press bed, a press head, a plurality of strain rods spacing and connecting said press head and said press bed, a support for a plurality of dies reciprocably and rotatably mounted on one of said strain rods and normally seated on said press bed, the said one strain rod being provided with a stationary double-acting piston having conduit means leading to each end of said piston, a cylinder slidably surrounding said stationary piston and being hydraulically reciprocable relative to said piston to lift said support off said bed, means associated with said cylinder and operable to establish driving connection between said support and said cylinder for rotation of said support with said cylinder, said cylinder being provided with a toothed portion, a reciprocable rack meshing with said toothed portion for rotating said cylinder, and hydraulically operable means operable to reciprocate said rack and to slow down the same at the end of its stroke, said cylinder being operable to allow re-seating of said support on said bed after said support has been moved by a predetermined angle.

WARREN R. TUCKER.